(12) United States Patent
Choi (10) Patent No.: US 8,870,263 B2
(45) Date of Patent: Oct. 28, 2014

(54) CONNECTING STRUCTURE SLIDING DOOR AND SWING DOOR FOR VEHICLE

(71) Applicant: Hyundai Motor Company, Seoul (KR)

(72) Inventor: Jae Hong Choi, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/706,173

(22) Filed: Dec. 5, 2012

(65) Prior Publication Data

US 2014/0077523 A1 Mar. 20, 2014

(30) Foreign Application Priority Data

Sep. 17, 2012 (KR) .................... 10-2012-0102830

(51) Int. Cl.
 *B60J 5/04* (2006.01)
 *E05D 15/48* (2006.01)
 *B60J 5/06* (2006.01)

(52) U.S. Cl.
 CPC *B60J 5/0479* (2013.01); *B60J 5/06* (2013.01); *B60J 5/043* (2013.01)
 USPC ........................................ 296/146.9; 49/169

(58) Field of Classification Search
 USPC ................. 296/146.1, 146.11, 146.12, 146.2, 296/146.6–146.9, 152, 38, 155, 56, 106, 296/76; 49/502, 506, 352; 29/525.06; 16/252
 See application file for complete search history.

(56) References Cited

U.S. PATENT DOCUMENTS

| | | | |
|---|---|---|---|
| 5,383,701 A * | 1/1995 | Okada | 296/146.9 |
| 6,477,806 B1 * | 11/2002 | Asada et al. | 49/169 |
| 6,848,737 B2 * | 2/2005 | Mikolai et al. | 296/146.9 |
| 6,926,342 B2 * | 8/2005 | Pommeret et al. | 296/155 |
| 7,950,704 B2 * | 5/2011 | Kovie | 292/336.3 |

FOREIGN PATENT DOCUMENTS

| | | |
|---|---|---|
| JP | 2008-239107 A | 10/2008 |
| JP | 2012-17024 A | 1/2012 |
| KR | 10-0947471 B1 | 3/2010 |
| KR | 10-0999734 B1 | 12/2010 |
| KR | 10-2011-0032950 A | 3/2011 |

\* cited by examiner

*Primary Examiner* — Glenn Dayoan
*Assistant Examiner* — Sunsurraye Westbrook
(74) *Attorney, Agent, or Firm* — Morgan, Lewis & Bockius LLP (57) ABSTRACT

A connecting structure of a sliding door and a swing door for a vehicle includes a front door swingably, and a rear door slidably installed; a first vertical beam vertically installed at the front door of the vehicle body and including upper and lower latch reinforcements which are horizontally installed at the upper and lower portions thereof, respectively; a second vertical beam vertically installed at the rear door of the vehicle body and including an upper and lower roller arm reinforcements which are horizontally installed at the upper and lower portions thereof, respectively; and a female and male pole brackets formed at rear and front sides of the front and rear doors, respectively. It is possible to improve safety by ensuring a side strength of the vehicle and increase marketable quality by reinforcing the connecting structure of the sliding door and the swing door at the same time.

6 Claims, 7 Drawing Sheets

CONNECTING STRUCTURE SLIDING DOOR AND SWING DOOR FOR VEHICLE

CROSS-REFERENCE TO RELATED APPLICATION

The present application claims priority of Korean Patent Application Number 10-2012-0102830 filed Sep. 17, 2012, the entire contents of which application is incorporated herein for all purposes by this reference.

BACKGROUND OF INVENTION

1. Field of Invention

The present invention relates to a connecting structure of a sliding door and a swing door for a vehicle, and more particularly, to a connecting structure of a sliding door and a swing door for a vehicle capable of ensuring a side strength of the vehicle for the sliding door without a B pillar and reinforcing the connecting structure of the sliding door and the swing door.

2. Description of Related Art

Generally, in order that a plurality of persons may enter easily inside and outside a room, a sliding door is provided in an omnibus vehicle of which a room is widely formed so that more passengers may board.

Figure 1A:
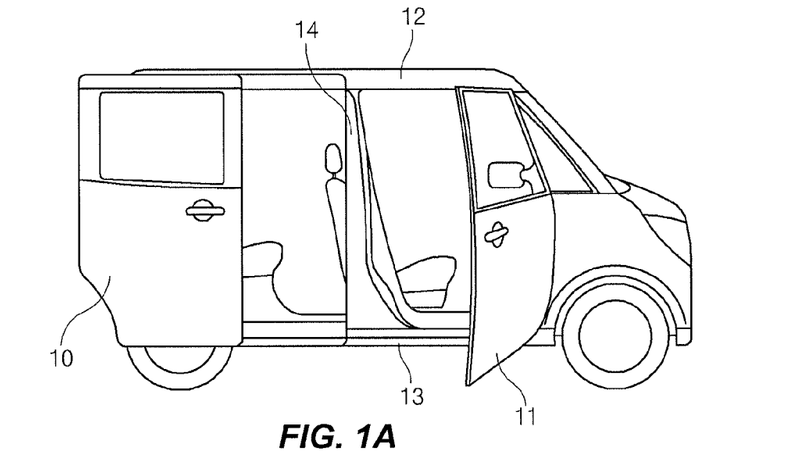
FIGS. 1A, 1B and 1C are diagrams illustrating a sliding door and a swing door for a vehicle in the prior art.

FIG. 1A illustrates an example of a vehicle to which a sliding door 10 with a B pillar is applied in the prior art, and the sliding door 10 guides a rail which is vertically attached to a vehicle body and moves along a quarter panel forming a side part of the vehicle body through a roller supported by roller arms at the upper and lower portions of the inner side of the door 10 to open the inside of the room.

In this case, a B pillar 14 which vertically connects and supports a loop 12 and a floor panel 13 of the vehicle body is installed between a swing door 11 and the sliding door 10.

However, since the B pillar 14 vertically blocks the center of the side part of the vehicle body, when the passenger gets in or out of the vehicle, particularly, a back seat, a space is small.

Figure 1B:
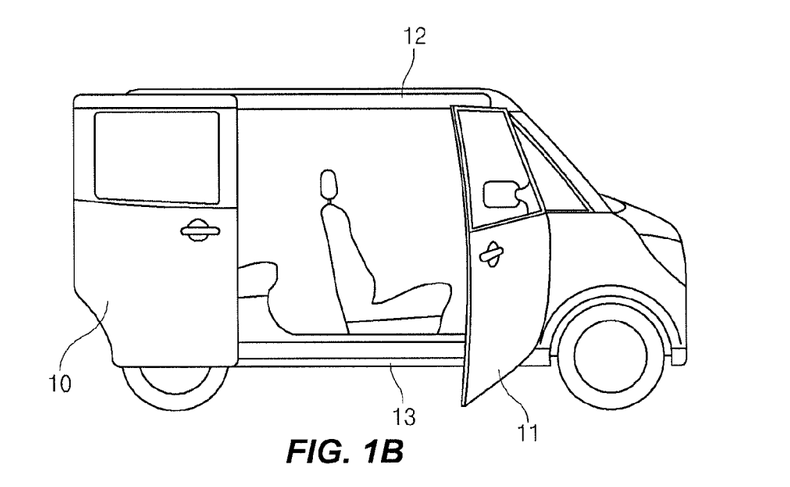

In consideration of the aspect, recently, as illustrated in FIG. 1B, a vehicle to which a sliding door without a B pillar is applied has been developed, and as a result, the getting in and out characteristic in which the passenger can easily get in or out of the vehicle may be improved to improve marketable quality of the vehicle.

However, the vehicle without the B pillar in the prior art needs to satisfy a side door strength rule of a predetermined level or more, and since the side door rule is a requirement for producing and marketing the vehicle, there is a problem in that the strength of the pillar needs to be compensated in the door 10.

Figure 1C:
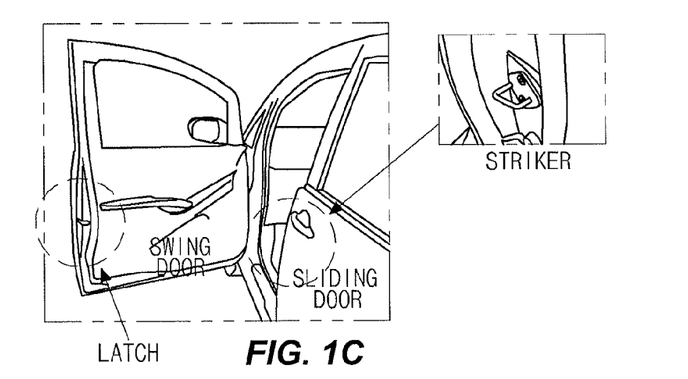

Further, in the prior art, as illustrated in FIG. 1C, the strength is ensured by installing the latch at the swing door and configuring a striker inside the sliding door. However, in this case, the strength is stable, but there is a problem in that the swing door has to be opened in order to open the sliding door.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to solve the above-mentioned problems occurring in the prior art while advantages achieved by the prior art are maintained intact.

Various aspects of the present invention provide for a connecting structure of a sliding door and a swing door for a vehicle having advantages of ensuring a side strength of the vehicle for the sliding door without a B pillar and reinforcing the connecting structure of the sliding door and the swing door.

Various aspects of the present invention provide for a connecting structure of a sliding door and a swing door for a vehicle, including: a front door swingably installed at the front of a vehicle body and a rear door slidably installed at the rear of the vehicle body; a first vertical beam vertically installed at the front door of the vehicle body and including an upper latch reinforcement and a lower latch reinforcement which are horizontally installed at the upper and lower portions thereof, respectively; a second vertical beam vertically installed at the rear door of the vehicle body and including an upper roller arm reinforcement and a lower roller aim reinforcement which are horizontally installed at the upper and lower portions thereof, respectively; a female pole bracket formed at the rear side of the front door; and a male pole bracket formed at the front side of the rear door.

In this case, the top of the front door may be fixed to the upper latch reinforcement included in the first vertical beam, and the bottom of the front door may be fixed to the lower latch reinforcement.

Further, the top of the rear door may be fixed to the upper roller arm reinforcement included in the second vertical beam, and the bottom of the rear door may be fixed to the lower roller arm reinforcement.

In this case, the front door may be fixed to the upper latch reinforcement and the lower latch reinforcement by welding, and the rear door may be fixed to the upper roller arm reinforcement and the lower roller arm reinforcement by welding.

Meanwhile, the front door may further include a first reinforcement and the female pole bracket may be installed on an end of the first reinforcement, and the rear door may further include a second reinforcement and the male pole bracket may be installed on an end of the second reinforcement.

Here, the first reinforcement may be coupled with the first vertical beam, and the second reinforcement may be coupled with the second vertical beam.

Meanwhile, a locking bracket may be formed at the rear top of the rear door, and a locking groove may be formed at the top of the vehicle body corresponding to the rear top of the rear door.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
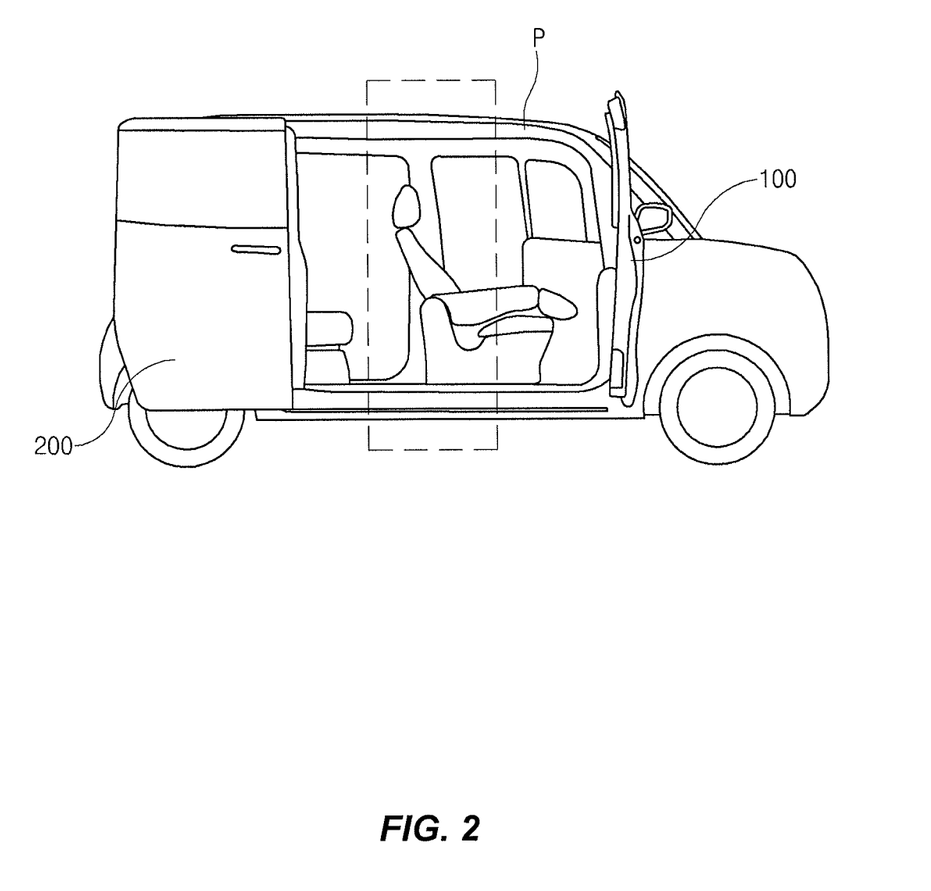
FIGS. 2 and 3 are diagrams illustrating an exemplary connecting structure of a sliding door and a swing door for a vehicle according to the present invention.
Figure 3:
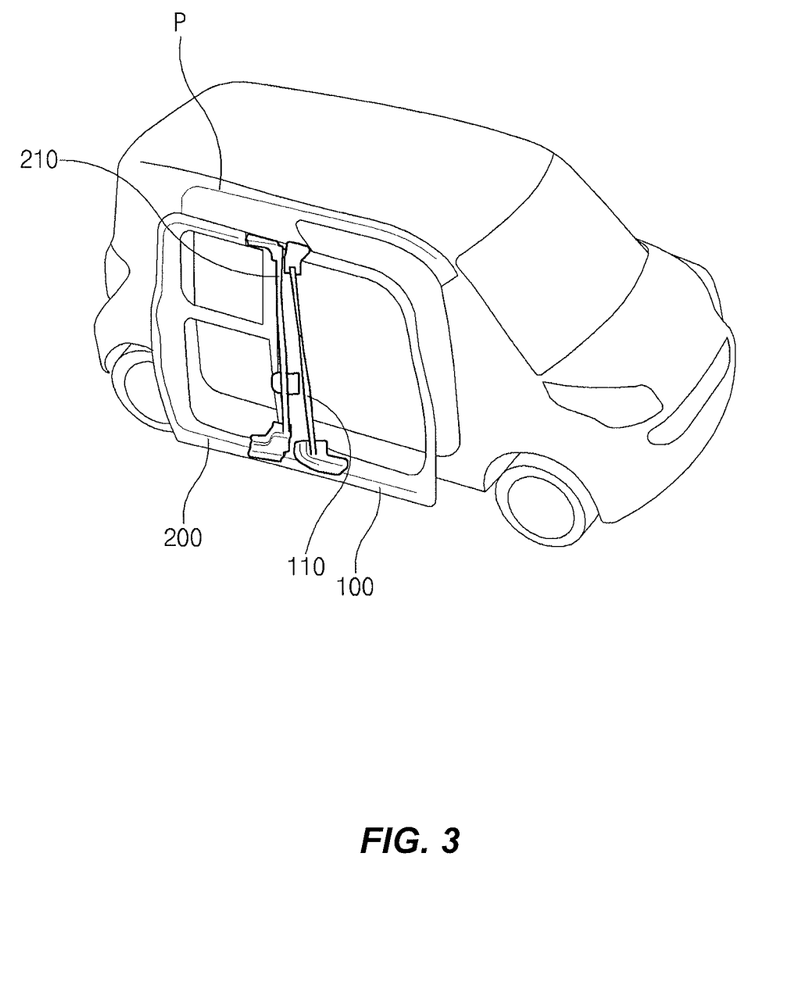
Figure 4:
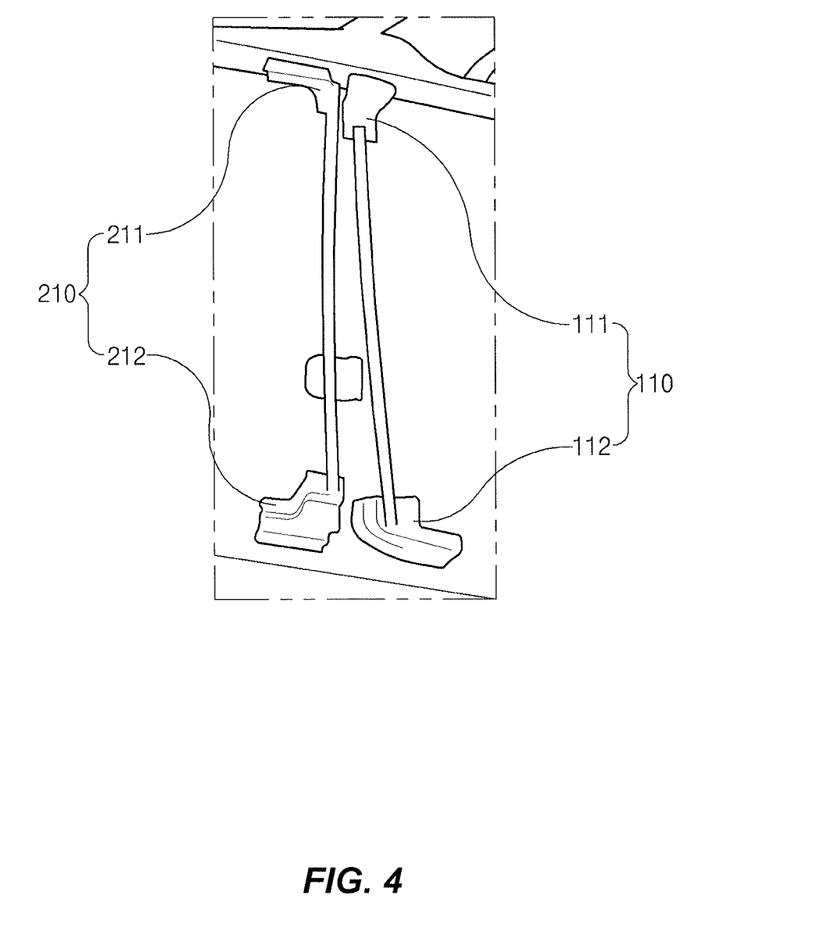
FIG. 4 is a diagram illustrating a first vertical beam and a second vertical beam in an exemplary connecting structure of the sliding door and the swing door for a vehicle according to the present invention.

As illustrated in FIGS. 2 to 4, a connecting structure of a sliding door and a swing door for a vehicle according to various embodiments of the present invention includes a first vertical beam 110 vertically installed to a front door 100, a second vertical beam 210 vertically installed to a rear door 200, and a female pole bracket 120 and a male pole bracket 220 which are provided in the front door 100 and the rear door 200, respectively, in which a swing type front door 100 and a sliding type rear door 200 are provided in a vehicle body P.

As illustrated in FIGS. 2 to 4, the present invention does not include a B pillar in order to easily get in or out of the vehicle to which both a sliding door and a swing door are applied, and improves a side strength of a vehicle without the B pillar.

The front door 100 is installed on the front side of the vehicle body P to be opened and closed along a swing track.

The rear door 200 is installed on the rear side of the vehicle body P to be opened and closed by longitudinal sliding.

The first vertical beam 110 is formed in a bar shape to be vertically installed at the rear of the front door 100 of the vehicle body P.

An upper latch reinforcement 111 is horizontally formed at the upper portion of the first vertical beam 110 and a lower latch reinforcement 112 is horizontally formed at the lower portion of the first vertical beam 110, and as a result, the front door 100 including the first vertical beam 110 may be locked or unlocked and rigidity of the front door 100 may be improved.

In this case, the upper latch reinforcement 111 may be included in the first vertical beam 110 is fixed to the top of the front door 100 and the lower latch reinforcement 112 is fixed to the bottom of the front door 100. The upper latch reinforcement 111, and the lower latch reinforcement 112 may be fixed to the front door 100 by welding to improve the rigidity of the front door 100.

The second vertical beam 210 is formed in a bar shape like the first vertical beam 110 to be vertically installed at the front of the rear door 200 of the vehicle body P.

An upper roller arm reinforcement 211 is horizontally formed at the upper portion of the second vertical beam 210 and a lower roller arm reinforcement 212 is horizontally formed at the lower portion of the second vertical beam 210, and as a result, the rear door 200 including the second vertical beam 210 may be slid and rigidity of the rear door 200 may be improved.

The upper roller arm reinforcement 211 may be included in the second vertical beam 210 is fixed to the top of the rear door 200 and the lower roller arm reinforcement 212 is fixed to the bottom of the rear door 200. The upper roller arm reinforcement 211 and the lower roller arm reinforcement 212 may be fixed to the rear door 200 by welding to improve the stiffness of the rear door 200.

Figure 5A:
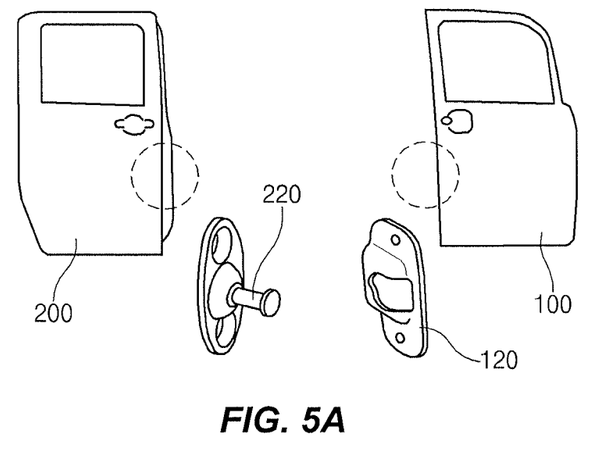
FIGS. 5A and 5B are diagrams illustrating a female pole bracket and a male pole bracket in an exemplary connecting structure of the sliding door and the swing door for a vehicle according to the present invention.
Figure 5B:
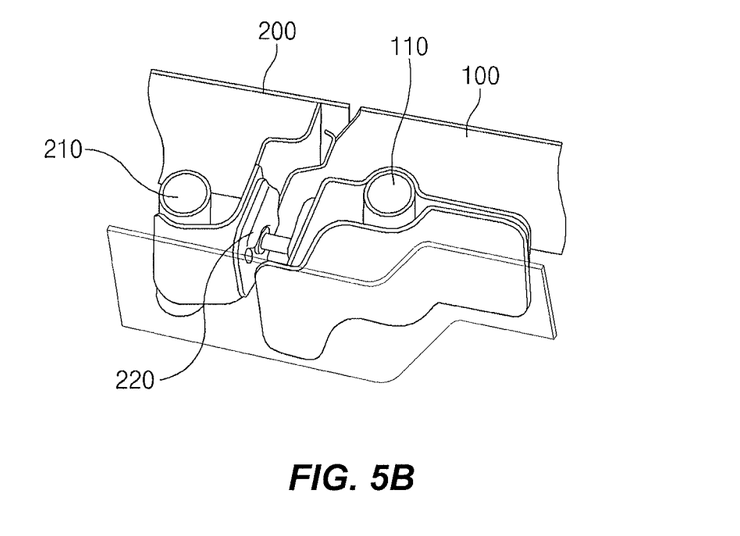

Meanwhile, as illustrated in FIGS. 3 to 5, the female pole bracket 120 provided at the rear side of the front door 100 and the male pole bracket 220 provided at the front side of the rear door 200 may be locked or unlocked between the front door 100 and the rear door 200 to prevent the front door 100 and the rear door 200 from being left and automatically opened.

As such, in various embodiments of the present invention, the front door 100 and the rear door 200 may be usually opened and closed regardless of an order by holding the front door 100 and the rear door 200 through the female pole bracket 120 and the male pole bracket 220.

Figure 7A:
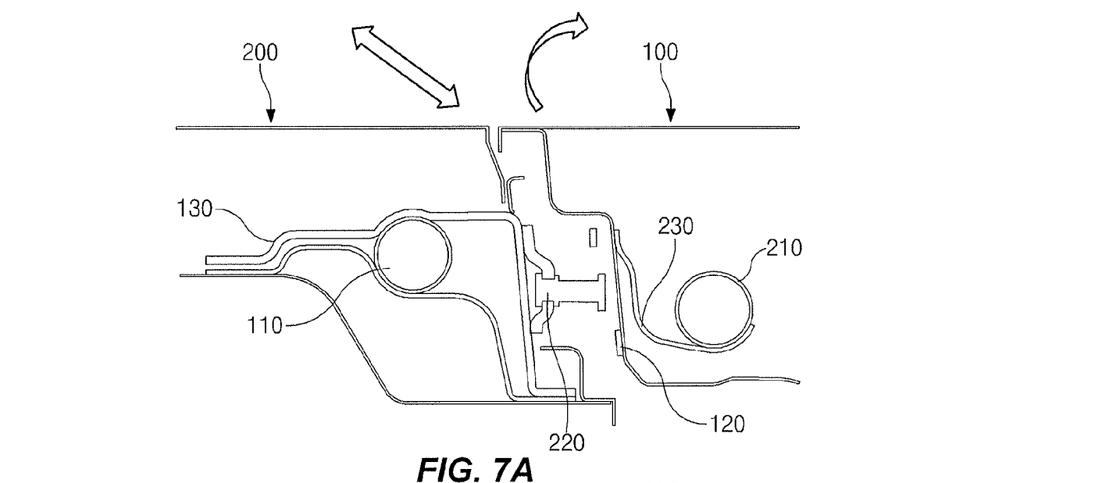
FIGS. 7A, 7B and 7C are diagrams illustrating an operational relationship between a front door and a rear door in an exemplary connecting structure of the sliding door and the swing door for a vehicle according to the present invention.

In this case, as illustrated in FIGS. 5 and 7A, the front door 100 includes a first reinforcement 130, the female pole bracket 120 is installed on an end of the first reinforcement 130, the rear door 200 includes a second reinforcement 230, and the male pole bracket 220 is installed on an end of the second reinforcement 230. As a result, since mutual interference does not occur with respect to an open direction of the front door 100 and an open direction of the rear door 200, use convenience and marketable quality may be improved.

Figure 7B:
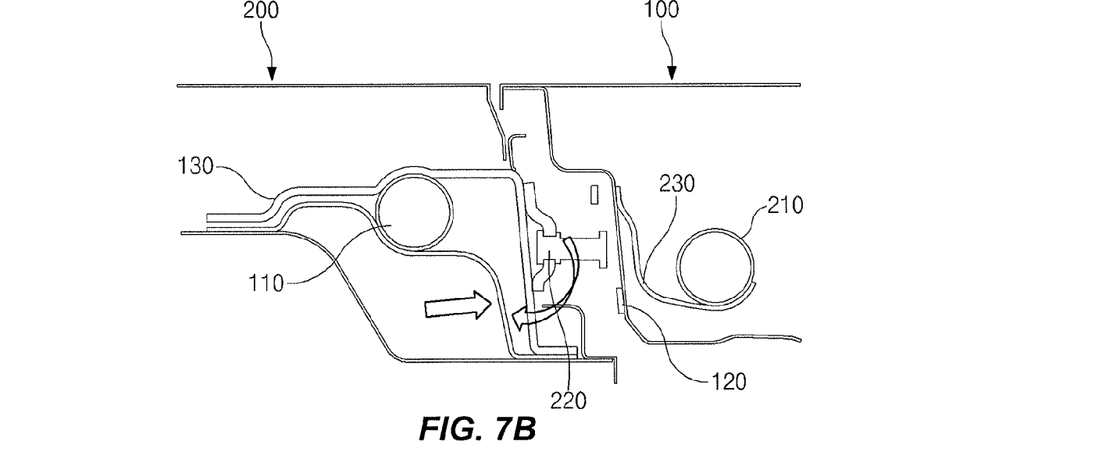
Figure 7C:
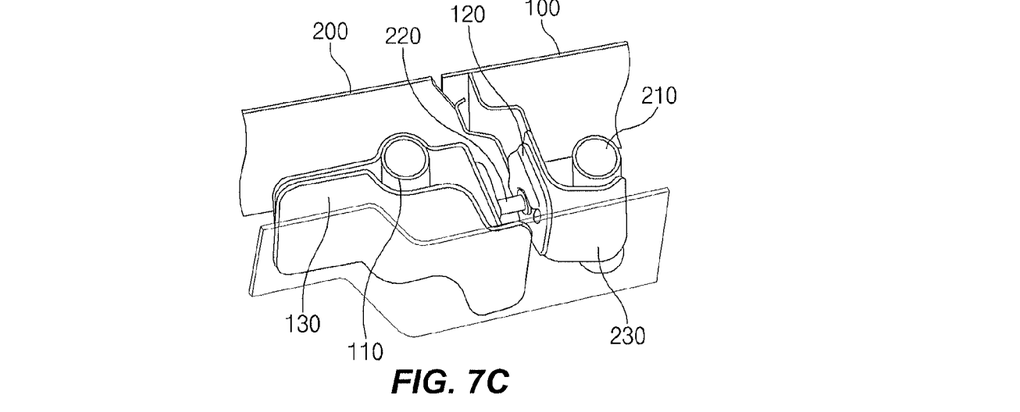

Herein, as illustrated in FIGS. 7A and 7B, the first reinforcement 130 is coupled with the first vertical beam 110 by welding and the second reinforcement 230 is coupled with the second vertical beam 210 by welding to minimize deformation due to load occurrence and improve the rigidity.

Further, the connecting structure of the present invention is adjusted to a side profile of the vehicle to be formed in a bending shape in order to ensure safety during a broadside collision. The load is supported by connecting the plurality of vertical beams and reinforcements with a high-stiffness member of the vehicle body P, and as a result, the stiffness may be improved.

Figure 6:
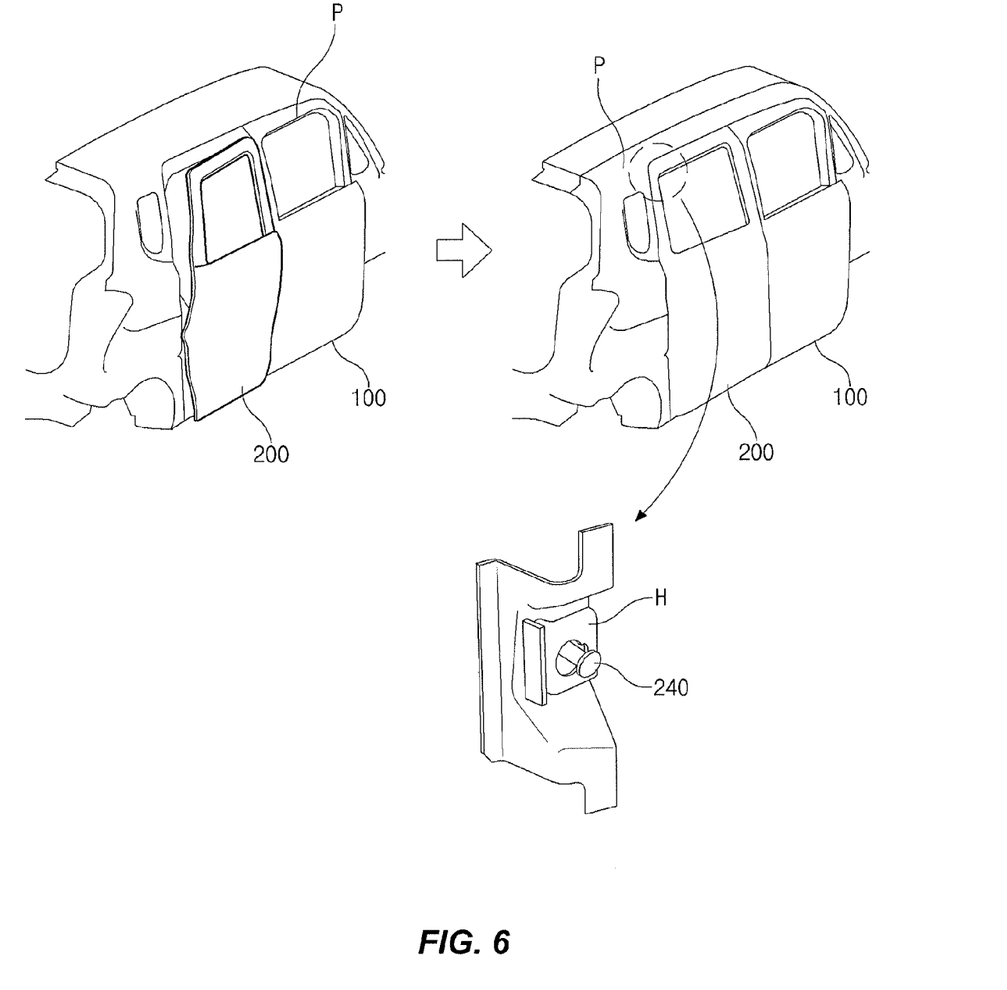
FIG. 6 is a diagram illustrating a locking bracket and a locking groove in an exemplary connecting structure of the sliding door and the swing door for a vehicle according to the present invention.

Meanwhile, as illustrated in FIG. 6, the locking bracket 240 is formed at the rear top of the rear door 200 and a locking groove H is formed at the top of the vehicle body P corresponding to the rear top of the rear door 200, and as a result, it is possible to prevent the top of the rear door 200 from being opened and improve marketable quality.

As set forth above, according to various embodiments of the present invention, it is possible to improve safety by ensuring a side strength of the vehicle and increase marketable quality by reinforcing the connecting structure of the sliding door and the swing door at the same time.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A connecting structure of a sliding door and a swing door for a vehicle, comprising:
    a front door swingably installed at a front of a vehicle body and a rear door slidably installed at a rear of the vehicle body;
    a first vertical beam vertically installed at the front door and including an upper latch reinforcement and a lower latch reinforcement which are horizontally installed at upper and lower portions thereof, respectively;
    a second vertical beam vertically installed at the rear door and including an upper roller arm reinforcement and a lower roller arm reinforcement which are horizontally installed at upper and lower portions thereof, respectively;
    a female pole bracket formed at a rear side of the front door;
    a male pole bracket formed at a front side of the rear door;
    a locking bracket formed at a rear top of the rear door; and
    a locking groove formed at a top of the vehicle body corresponding to the rear top of the rear door.

2. The connecting structure of a sliding door and a swing door for a vehicle according to claim 1, wherein the top of the front door is fixed to the upper latch reinforcement included in the first vertical beam, and the bottom of the front door is fixed to the lower latch reinforcement.

3. The connecting structure of a sliding door and a swing door for a vehicle according to claim 1, wherein the top of the rear door is fixed to the upper roller arm reinforcement included in the second vertical beam, and the bottom of the rear door is fixed to the lower roller arm reinforcement.

4. The connecting structure of a sliding door and a swing door for a vehicle according to claim 2 or 3, wherein the front door is fixed to the upper latch reinforcement and the lower latch reinforcement by welding, and the rear door is fixed to the upper roller arm reinforcement and the lower roller arm reinforcement by welding.

5. The connecting structure of a sliding door and a swing door for a vehicle according to claim 1, wherein the front door further includes a first reinforcement and the female pole bracket is installed on an end of the first reinforcement, and the rear door further includes a second reinforcement and the male pole bracket is installed on an end of the second reinforcement.

6. The connecting structure of a sliding door and a swing door for a vehicle according to claim 4, wherein the first reinforcement is coupled with the first vertical beam, and the second reinforcement is coupled with the second vertical beam.

* * * * *